2,933,527
PROCESS FOR THE MANUFACTURE OF UREA IN GRANULAR FORM

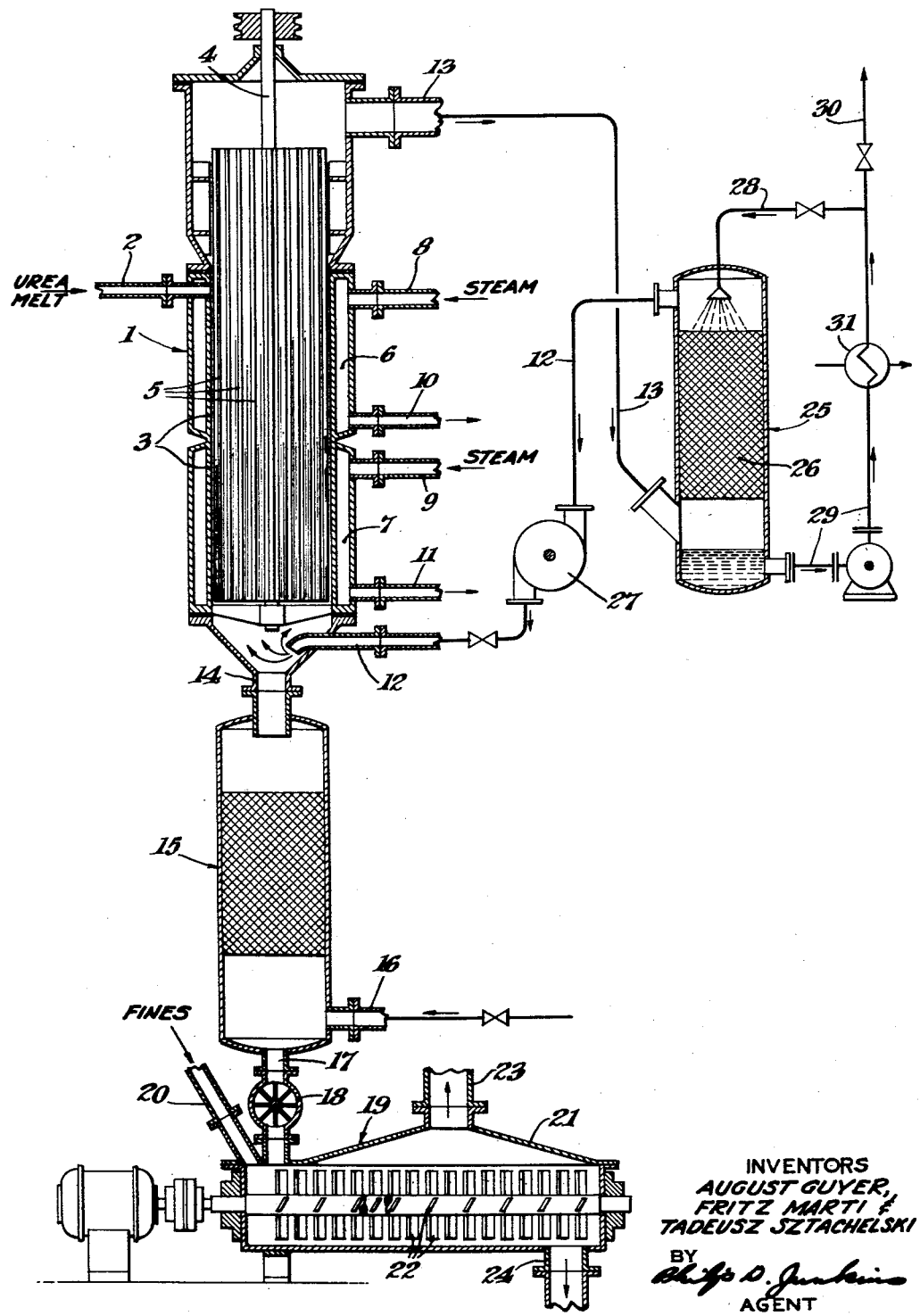

August Guyer, Zurich, Fritz Marti, Basel, and Tadeusz Sztachelski, Visp, Switzerland, assignors to Lonza Electric and Chemical Works Ltd., Basel, Switzerland, a corporation of Switzerland Application November 19, 1956, Serial No. 622,732

Claims priority, application Switzerland April 13, 1956

5 Claims. (Cl. 260—555)

This invention relates to the manufacture of urea in granular form from an aqueous urea solution. More particularly the invention relates to a method for the continuous production of a water-free granular urea having a substantially reduced biuret content and is an improvement on the process disclosed in co-pending application Serial No. 622,731, filed November 19, 1956.

It is well known that when ammonia and carbon dioxide are subjected to high temperature in a closed system, high pressures are generated and urea is formed. For example, urea synthesis has been conducted at pressures of from about 200–350 atmospheres in an autoclave maintained at temperatures of 160°–220° C. During the synthesis reaction the ammonia and carbon dioxide primarily combine exothermically to form ammonium carbamate which at the temperature of the reaction is transformed into urea and water. The resulting reaction effluent contains in addition to urea and water, uncombined residues of the starting materials and ammonium carbonate, bicarbonate and carbamate.

It is also known to treat such urea synthesis effluent by a number of different procedures to recover from it the ammonia and carbon dioxide which have not been converted to urea and to vaporize the water so as to obtain finally a relatively pure solid form of urea. For example, it has been proposed in U.S. Patent 2,267,133 to vaporize ammonia, carbon dioxide and a portion of the water from the effluent while it is passing rapidly through an externally heated tube. The mixture of liquid and gas leaving the tube is treated to separate the gas from the liquid with the liquid thereafter being passed through a packed tower in countercurrent flow to a stream of hot air. The degassed liquid (75–85% urea) may be obtained by other known procedures and may be treated as above for final drying or may be crystallized in a centrifuge. Also, urea synthesis effluents have been treated by direct contact with steam for distilling the solution up to 95–99% followed by prilling.

The above described processes for obtaining a pure solid form of urea have many inherent disadvantages and shortcomings. Among the most detrimental are: premature crystallization resulting in plugging of apparatus; increased quantities of decomposition products including biuret in the solid urea because of long time high temperature evaporation; high water content in the solid urea requiring further drying with resultant product decomposition; losses of desired product by decomposition; and unusable product forms such as oversize and undersize granules.

In co-pending application Serial No. 622,731, there is disclosed a method for overcoming the disadvantages of the above prior proposals and to provide a new and improved method for the granulation of urea-containing solutions whereby the product urea granules are substantially water-free and have not had an appreciable increase in percent of biuret content. The invention disclosed in the above mentioned application resides in the discovery that substantially water-free urea granules of very low biuret content result from a very rapid partial evaporation of an aqueous urea solution under vacuum or at normal pressure followed by rapid cooling of the solution to just above the temperature of crystallization and substantially immediate granulation of the cooled solution in the presence of solid urea fines. Through the use of such process it is possible to obtain a free-flowing granular product containing less than 2% of biuret, such product further having an extremely low water content, for example, 0.1 to 0.2% by weight, and a crushing strength of about 300 grams per square millimeter. However, for many industrial and agricultural applications, urea having a biuret content of 2% or more is unacceptable. For instance, with formaldehyde in textile finishing and treating solutions, biuret contained in the urea is completely undesirable because it causes turbidity of the solutions and, subsequently, destroys the brilliancy of the textile finish. Further, in the plastics industry high biuret urea must be rejected as producing a turbid product, while in the fertilizer and cattle feed industries high biuret urea has destroyed agricultural products and has been disclaimed as a safe fodder ingredient.

It is an object of the present invention to provide a new and improved method of granulating aqueous solutions of urea while at the some time decreasing the content of biuret or other decomposition products.

It is a further object of the invention to provide an improved method of granulating aqueous solutions of urea whereby the solid urea product is substantially water-free and has a materially decreased biuret content.

Other objects and advantages of the invention will be apparent from the following specification wherein preferred embodiments and details of the invention are described.

Accordingly, the present invention accomplishes the above objects by the discovery that urea granules resulting from a granulation process including (1) rapid, high temperature, partial evaporation of an aqueous urea solution followed by (2) immediate cooling of such solution to just above the temperature of crystallization and (3) substantially immediate granulation in the presence of solid urea fines, have a substantially reduced biuret content when the high temperature evaporation is carried out in the presence of, and the cooling is accomplished by a gaseous phase of ammonia. Through the use of the above process, as described in further detail hereinafter, it is possible to obtain a free-flowing granular product containing less than 1% of biuret, such product further being substantially water-free and having a crushing strength of 300 grams per square millimeter or more. The present invention not only provides a method of obtaining a substantially improved solid urea product but also has the additional advantages of simplicity of control, operation and equipment and reduced investment and operational costs.

The initial short time partial evaporation of the aqueous urea solution may be accomplished in a film-type evaporator wherein the solution is heated to from about 120°–180° C. for less than several minutes in the presence of ammonia. By rapidly evaporating only to the extent whereby the solution concentration is approximately 97–99% urea, there is substantially no increase in urea decomposition to form biuret and such biuret that is present or is formed is immediately ammoniated by the ammonia present whereby it may be partially converted back to urea. The concentrated urea liquor leaving the evaporator is quickly cooled to a temperature which is just above the crystallization temperature, which may be about 130–140° C., such rapid cooling also inhibiting the formation of biuret and further reducing the water content. The cooling is accomplished by countercurrent contact of the concentrated urea solution with gaseous ammonia in a packed tower or the like. Cooling with ammonia further reduces urea conversion to biuret. The cooled concentrated liquor next passes directly to a granulation apparatus wherein it is immediately and intimately mixed with solid urea fines (ratio of fines to fresh melt approximately 1:1 to 3:1 by weight). The urea melt-urea fines mixture quickly crystallizes whereby granulation to a homogeneous product is completed in but a few feet of travel through the granulator with the resultant granules having a solid concentration of 99.8% or higher and a biuret content of less than 1% of the solid urea. The granulation process including treatment of oversize and undersize particles may be accomplished substantially as disclosed in Serial No. 622,731.

The invention is further described by reference to the accompanying drawing in which the figure illustrates a preferred embodiment of apparatus for accomplishing the purposes of the invention.

Referring to the figure, an aqueous urea solution to be granulated is introduced to an evaporator 1 through line 2. Such evaporator, which as shown is of agitated-film design, consists of a vertical heated cylinder 3 containing a rotor 4. The rotor is provided with blades 5 which approach the heated cylinder wall 3 with controlled clearance. The aqueous urea solution as introduced through pipe 2 is quickly formed into a thin film by the rotating blades 5 and the cylinder wall 3. This film rapidly spirals downwardly and is heated by indirect heat exchange through cylinder wall 3. The wall 3 is heated by steam entering steam jackets 6 and 7 through pipes 8 and 9, respectively. After giving up heat to wall 3 the steam in spaces 6 and 7 is removed through pipes 10 and 11, respectively. Ammonia for ammoniating the film of urea solution undergoing evaporation is introduced through pipe 12. Such ammonia passes upwardly between the blades in contact with the aqueous film and leaves the evaporator with freed water vapor through pipe 13. The urea melt (97–99% pure urea) leaves the evaporator 1 through pipe 14. At any given instant during operation there is little liquid solution contained in the evaporator and the liquid contact time is very short permitting highly sensitive evaporation.

The 97–99% urea melt leaving the evaporator through pipe 14 substantially immediately passes through cooler 15, which may be a packed tower and through which relatively cool ammonia is passed, whereby the melt is cooled to a temperature a few degrees above its crystallization temperature. Ammonia for cooling enters through pipe 16 and is removed with ammonia from pipe 12 by passage through the evaporator and pipe 13. The ammonia passing through the cooler thereby aids ammonia from pipe 12 in acting on biuret in the aqeous film within the evaporator. The cooled urea melt leaves the cooler through pipe 17 and valve 18 and is immediately introduced into granulator 19. The valve 18 acts to readily admit melt but prohibits the amomnia coolant from escaping from the cooler with the cooled urea melt. Solid urea fines are introduced to the granulator through line 20 for immediate mixing with the melt. The granulator may comprise of a stationary housing 21 in which several impellers 22 rotate in opposing rotation and mix, disintegrate and feed the material along whereby granulation occurs in but a few feet of material travel. A slight draft is maintained on the granulator with moist air being removed through pipe 23. Completely granulated urea is removed through pipe 24 and is cooled and processed as described in the aforementioned application.

The ammonia used for cooling in cooler 15 must be substantially water-free and preferably at a temperature of about 20–30° C. while the ammonia entering pipe 12 and which does not act as a coolant may carry some water vapor. In the figure there is indicated a simple ammonia scrubbing system which may be utilized to provide ammonia to the cooler and evaporator of the present invention. In such apparatus gaseous ammonia and water vapor leave evaporator 1 through line 13 and enter the scrubber 25 near the bottom whereby they may pass upwardly through the contact section 26. The undissolved ammonia remaining after contact in the scrubber is returned to evaporator 1 through line 12 and pump 27. Such ammonia contains a small unharmful amount of water vapor. The scrubbing medium for the column 25 enters as a spray from line 28 and consists of a portion of the liquid bottoms 29, such bottoms being comprised of water and dissolved ammonia. The remaining portion of bottoms 29 is removed through line 30 to conventional distillation apparatus for separation of the ammonia and water. Water-free ammonia from such distillation may then be used as the coolant 16 for cooler 15. A cooler 31 may be provided in line 29 whereby the scrubber 25 is maintained at a temperature of about 60° C.

When operating the above described apparatus or equivalent apparatus it has been observed that an aqueous urea solution (75–85% urea) may be evaporated in a first stage, in the presence of ammonia, to a concentration of 97–99% urea in less than several minutes at temperatures of between 120°–180° C. with substantially no increase in biuret content. The nearly water-free effluent is then quickly cooled by ammonia to a temperature just above its temperature of crystallization (130°–140° C.) and is then rapidly mixed with cool dry urea solid fines in a granulator (ratio of fines to melt, 1:1 to 3:1) whereby granulation immediately occurs as the melt is cooled to below its temperature of crystallization, the product granules containing less than 1% biuret.

While the manner of application of the invention may be varied widely, particularly with regards to specific apparatus design, the following example describes an operation of the process in apparatus designed substantially as described and embodied in an actual urea granulation plant. In the example parts are by weight.

*Example*

An aqueous solution containing 1000 parts urea and 250 parts water (80% urea) and having a temperature of about 100° C. was introduced (200 kgs./hr.) to an agitated-film evaporator heated by saturated steam (pressure of 12 atmospheres). The average residence time of the urea solution in the evaporator was 25 seconds. Samples of the solution leaving the evaporator indicated a 98.5% urea concentration at a temperature of 160° C. The 98.5% urea melt was substantially immediately introduced to a cooler of packed tower design for countercurrent contact with 40 parts of dry ammonia having a temperature of about 25° C. The concentrated urea melt leaving the cooler had an actual temperature of 131° C. (2° C. above the temperature of crystallization) and was immediately introduced to a pug mill type granulator in admixture with cool dry solid urea fines (ratio of fines to melt, by weight=2:1) having an average temperature of 50° C. Granulated urea and fines discharged from the granulator at about 90° C. were further cooled about 60° C. Samples of the granules were tested and found to contain less than 0.2% water. During evaporation the urea solution was contacted with, in addition to the 40 parts of ammonia from the cooler, a vapor comprising 40 parts of ammonia and 7 parts water. The overhead vapor from the evaporator showed 245 parts water and 80 parts ammonia. Prior to granulation the melt was tested as containing 12 parts water for 1000 parts urea (approximately 99% urea). Samples of the granules produced were tested and were found to contain less than 0.8% biuret whereas when operating the process (evaporation and cooling steps) without ammoniation and with the same proportions and conditions throughout, the granules showed a buiret content of about 2%.

The advantageous effects of short time, high temperature evaporation in the presence of ammonia followed by rapid cooling and immediate granulation of a degassed urea melt to obtain a substantially dry solid urea product containing less than 1% biuret will be apparent from the above example.

It will be appreciated that various modifications may be made in the invention described above without deviating from the scope thereof as defined in the appended claims.

We claim:

1. A process for the manufacture of substantially dry free-flowing granules of urea containing less than 1% of biuret by weight from an aqueous urea synthesis effluent substantially free of unconverted ammonia and carbon dioxide: consisting essentially of passing said aqueous urea effluent through an evaporative heating zone; introducing gaseous ammonia into said heating zone; rapidly heating said aqueous urea effluent during its passage through said zone and in the presence of said gaseous ammonia at a temperature below about 180° C. and for a time sufficient to form a concentrated urea effluent containing at least 97% urea by weight; immediately thereafter passing said concentrated urea effluent through a cooling zone wherein said effluent is cooled to a temperature within a few degrees above its crystallization temperature; immediately thereafter commixing said cooled concentrated urea effluent with cool solid urea fines whereby said cooled effluent is rapidly cooled to below its crystallization temperature and additional water is evaporated by the heat of crystallization; and intimately mixing said mixture until granulation thereof to form the dry free-flowing solid urea granules containing less than 1% of biuret and less than 1% of water by weight.

2. A process for the manufacture of substantially dry free-flowing granules of urea containing less than 1% of biuret by weight from an aqueous urea synthesis effluent substantially free of unconverted ammonia and carbon dioxide: consisting essentially of passing said aqueous urea effluent through an evaporative heating zone; introducing gaseous ammonia into said heating zone; rapidly heating said aqueous urea effluent during its passage through said zone and in the presence of said gaseous ammonia at a temperature below about 180° C. and for a time sufficient to form a concentrated urea effluent containing at least 97% urea by weight; immediately thereafter passing said concentrated urea effluent through a cooling zone wherein said effluent is cooled during contact with relatively cool gaseous ammonia to a temperature within a few degrees above its crystallization temperature whereby the dissociation of urea to biuret is inhibited; immediately thereafter commixing said cooled concentrated urea effluent with cool solid fines whereby said cooled effluent is rapidly cooled to below its crystallization temperature and additional water is evaporated by the heat of crystallization; and intimately mixing said mixture until granulation thereof to form the dry free-flowing solid urea granules containing less than 1% of biuret and less than 1% of water by weight.

3. A process for the manufacture of substantially dry free-flowing granules of urea containing less than 1% of biuret by weight from an aqueous urea synthesis effluent substantially free of unconverted ammonia and carbon dioxide: consisting essentially of passing said aqueous urea effluent through an evaporative heating zone; introducing a first quantity of gaseous ammonia into said heating zone; rapidly heating said aqueous urea effluent during its passage through said zone and in the presence of said gaseous ammonia at a temperature below about 180° C. and for a time sufficient to form a concentrated urea effluent containing at least 97% urea by weight; immediately thereafter passing said concentrated urea effluent through a cooling zone wherein said effluent is cooled during contact with a relatively cool second quantity gaseous ammonia to a temperature within a few degrees above its crystallization temperature whereby the dissociation of urea to biuret is inhibited, said second quantity of ammonia thereafter passing through said heating zone as a portion of said first quantity of ammonia; immediately thereafter commixing said cooled concentrated urea effluent with cool solid urea fines whereby said cooled effluent is rapidly cooled to below its crystallization temperature and additional water is evaporated by the heat of crystallization; and intimately mixing said mixture until granulation thereof to form the dry free-flowing solid urea granules containing less than 1% of biuret and less than 1% of water by weight.

4. A process according to claim 3 wherein the ratio of cool solid urea fines to cooled concentrated urea effluent during mixing thereof is from about 1:1 to 3:1 by weight.

5. A process according to claim 3 wherein the short time evaporative heating of the aqueous urea synthesis effluent is carried out under vacuum.

References Cited in the file of this patent

UNITED STATES PATENTS

| | | |
|---|---|---|
| 2,307,253 | Yee et al. | Jan. 5, 1943 |
| 2,527,315 | Mackay | Oct. 24, 1950 |

FOREIGN PATENTS

| | | |
|---|---|---|
| 586,025 | France | Dec. 20, 1924 |
| 125,219 | Switzerland | Apr. 2, 1928 |

OTHER REFERENCES

Perry's Chemical Engineers' Handbook, 3rd ed., McGraw-Hill, New York, 1950, pp. 510; 1054–1055.